(12) United States Patent
Silvester

(10) Patent No.: US 7,492,925 B2
(45) Date of Patent: Feb. 17, 2009

(54) BIOMETRIC IDENTIFICATION DATA PROTECTION

(75) Inventor: Kelan C. Silvester, Portland, OR (US)

(73) Assignee: Intel Corporation, Santa Clara, CA (US)

(*) Notice: Subject to any disclaimer, the term of this patent is extended or adjusted under 35 U.S.C. 154(b) by 804 days.

(21) Appl. No.: 10/877,455

(22) Filed: Jun. 25, 2004

(65) Prior Publication Data

US 2005/0286746 A1    Dec. 29, 2005

(51) Int. Cl.
*G06K 9/00* (2006.01)
(52) U.S. Cl. ........................................ 382/116
(58) Field of Classification Search ........ 340/5.52–5.53, 340/5.81–5.84; 380/232, 258, 259; 382/115–118; 713/186; 902/3
See application file for complete search history.

(56) References Cited

U.S. PATENT DOCUMENTS

| | | | |
|---|---|---|---|
| 6,496,595 B1 * | 12/2002 | Puchek et al. | 382/124 |
| 6,850,147 B2 * | 2/2005 | Prokoski et al. | 340/5.53 |
| 2002/0186838 A1 * | 12/2002 | Brandys | 380/30 |
| 2004/0044627 A1 * | 3/2004 | Russell et al. | 705/50 |
| 2004/0099731 A1 * | 5/2004 | Olenick et al. | 235/380 |
| 2004/0266533 A1 * | 12/2004 | Gentles et al. | 463/42 |
| 2005/0226468 A1 * | 10/2005 | Deshpande et al. | 382/115 |

* cited by examiner

*Primary Examiner*—Sherali Ishrat
(74) *Attorney, Agent, or Firm*—Robert A. Diehl

(57) ABSTRACT

Embodiments of the present invention can combine biometric identification data with additional information, or knowledge, to form a new type of security measure. One embodiment of the present invention obtains biometric identification data for accessing a particular context, identifies context identification data related to the particular context, and combines the biometric identification data and the context identification data into an identification template.

50 Claims, 10 Drawing Sheets

BIOMETRIC IDENTIFICATION DATA PROTECTION

FIELD OF THE INVENTION

The present invention relates to the field of security. More specifically, the present invention relates to protecting biometric identification data.

BACKGROUND

Biometrics is the statistical study of biological data. According to biometrics, every person has certain biological characteristics or traits that are virtually unique. In other words, biometric data can be used to identify an individual to a statistical certainty.

Biometric identification can be used for a variety of purposes, not the least of which is security. For instance, fingerprint scanners, retina scanners, DNA analyzers, facial recognition tools, and various other techniques and devices can collect biometric data and use the data to authenticate the identity of a would-be user. Biometric-based security measures can be used in place of, or in addition to, knowledge-based security measures, such as passwords or PINs (personal identification number) to access an ATM (automatic teller machine), a computer, a PDA (personal data assistant), a cell phone, or virtually any other device or service.

Biometric-based security measures can be quite convenient for users. There is nothing to memorize and no need to devise unique words or phrases to try to outsmart identity thieves and computer hackers. With biometrics, the identifying information is simply part of each user, and each user is virtually guaranteed that no other user will have exactly the same identifying information.

Unfortunately, the same aspects of biometric-based security that make it powerful and convenient, also expose its greatest weaknesses. Since the identifying information is a part of each user, a user is likely to expose his or her biometric "signature" everywhere he or she goes. For instance, a user may leave behind latent fingerprints or DNA samples, or simply expose his or her face to a camera, allowing bad actors to directly obtain the data they want. Similarly, biometric data, especially fingerprints, may be on file with any number of governmental and private entities where the data can be misappropriated or otherwise stolen. And, once a user's biometric data have been compromised, there is usually no way to change or revoke it. That is, unlike a password that can be easily and frequently changed, it may be impossible to change a person's fingerprints, retinal pattern, or DNA.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Figure 1:
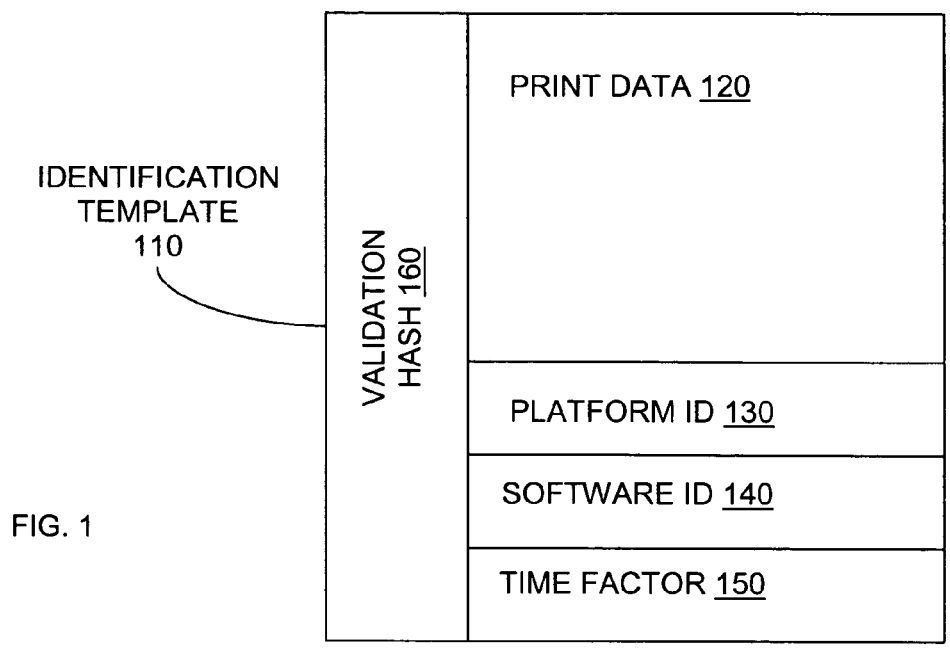
FIG. 1 illustrates one embodiment of an identification template.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention can combine biometric identification data with additional information, or knowledge, to form a new type of security measure. By combining the two types of data, embodiments of the present invention can utilize the strengths of each to provide better convenience and security than either type of data can provide alone.

For example, in various embodiments of the present invention, biometric identification data can be combined with context-specific data to form an authentication certificate. The context-specific data can limit the use of the certificate to a particular context, such as a particular computer platform, a particular software application, and/or a particular time frame. As long as the user is working within the appropriate context, embodiments of the present invention can be used much like existing biometric-based security measures. That is, the user may be able to gain access to a device or service by conveniently placing his or her finger on a fingerprint scanner.

Outside of the appropriate context, however, the fingerprint alone may be useless. For example, if a notebook computer is used to access a network and the user's fingerprint is limited to use on that particular notebook computer, the fingerprint alone could not be used to access the network from a different computer. In other words, the knowledge-based aspect of the authentication certificate, namely the context information, can protect the network even if the biometric-based aspect of the certificate is compromised. Similarly, if the notebook computer is stolen, but the fingerprint data is unavailable, the certificate may still protect the network.

Also, much like a knowledge-based system, embodiments of the present invention can be used to revoke an authentication certificate. For example, by combining a time duration with biometric identification data, a certificate can be automatically revoked when the duration expires. Similarly, a certificate can be manually revoked by changing the data combined with the biometric identification data, much like changing a password or PIN.

Although the embodiments of the present invention that are described below can be applied to virtually any kind of biometric identification data, including retina scans, voice recognition, facial recognition, DNA analysis, the description will refer primarily to fingerprint data purely for purposes of explanation. The description also uses the terms such as "secure," "protected," "encrypted," "authenticated," etc. These terms refer to a given level of security, protection, authenticity, etc. The terms do not imply that any memory, device, encryption, or authentication is completely impregnable, completely tamper-resistant, completely foolproof, etc.

Furthermore, a wide variety of algorithms and products have been developed to capture and analyze biometric data. In many cases, raw biometric data is collected and converted to a more convenient mathematical form or template. For instance, when a fingerprint is scanned, a scanner usually generates a bit map of the fingerprint. The raw data from the bit map can then be analyzed to recognize identifying points, called minutiae. In a typical analysis, anywhere from 150 to 300 minutiae may be identified and recorded in a particular format, often taking the form of data points in a table or template. As used herein, the terms "biometric identification data" and "fingerprint data" are widely defined to include any possible form of raw and/or mathematically generated biometric data.

FIG. 1 illustrates one embodiment of biometric identification data combined with additional data to form an authentication certificate, or identification template 110. In template 110, the biometric identification data comprises fingerprint data 120 to identify a particular user. The data that is combined with the print data 120 defines a particular context in which the template can be used. The context includes platform identification 130, software identification 140, and time factor 150.

Platform identification 130 may be virtually any information that can be used to uniquely identify a particular machine or device where template 110 can be validly used to gain access. Platform identification 130 may include, for instance, a serial number of one or more processors and/or other components within the device. Similarly, platform identification 130 may include an asset serial number of the particular device itself, or the contents of PCRs (platform configuration registers) from a TPM (trusted platform module) within the device. Platform identification 130 may be generated using a standard set of data gathered from specific devices within the platform, or perhaps from a set of user selected devices thus creating a pattern only known to the user who selected those devices. Platform identification 130 may also include a unique or randomly generated number or information associated with the device. Platform identification 130 can be taken from within the device itself, or received from an external source, or taken from a combination of internal and/or external sources.

Software identification 140 may be virtually any information that can be used to identify a particular software application or service for which template 110 can be validly used to gain access. Similar to platform identification 130, software identification 140 may include a serial number of the application and/or any other unique or randomly generated number or other information associated with the application. Software identification 140 can be taken from the application itself, received from an external source, or both.

Time factor 150 can be used to define the time frame for which the template is valid. Time factor 150 may be specified in any number of ways. For example, time factor 150 may specify an expiration time and/or an activation time. Alternatively, time factor 150 may simply define a duration from which a device or application will count down until the duration expires and the template is invalidated. As another example, time factor 150 may define a certain number iterations that a user can log-in to a device and/or application using the template before the template expires.

In addition to context data, template 110 also includes validation hash 160. Validation hash 160 can be used to increase the level of security for template 110. Hash 160 is the result of performing a hashing algorithm on one or more of the other data fields. Hashing is usually similar to data compression—a larger set of data is reduced by the algorithm to a smaller set of data. Every time the same set of data is hashed, the result should be the same. Furthermore, the probability of any two sets of data generating the same result should be very unlikely. So, a hash can be used to detect data tampering or corruption. That is, if a set of data is hashed at two different times and the hash results do not match, then there is a very high probability that the set of data changed in the interim.

In the case of template 110 from FIG. 1, hash 160 may be a hash of all four of the other data fields—print data 120, platform identifier 130, software identifier 140, and time factor 150. In which case, if a bad actor were to replace or modify any of the four data fields, it may be possible to detect the tampering by re-hashing the data fields and comparing to hash 160.

This assumes, of course, that the bad actor is not able to also replace hash 160. To reduce the chances of hash 160 being replaced, any of a variety of one-way hashing algorithms can be used. SHA-1 is an example of an industry accepted one-way hashing algorithm. One-way hashes often introduce an unknown, or random, factor in the data compression. The unknown factor is virtually impossible to recover from the resulting hash. Without the unknown factor, the original set of data is also virtually impossible to recover from the resulting hash. Furthermore, without the same unknown factor, it is virtually impossible to generate the same hash results. In other words, as long as a bad actor does not have access to the unknown factor, data tampering or corruption should be detectable using hash 160.

The illustrated embodiment comprises a visual representation of a data structure that can be stored in any number of ways. Other embodiments may include additional data fields, may not include all of the illustrated data field, may arrange the data fields differently, and/or may store one or more of the data fields separately.

In other embodiments, rather than using all four of the other data fields to generate hash 160, one or more of the other data fields may not be used. The hash may also be stored separately from the rest of the template. For instance, the hash may be stored on a smart card and the rest of the template may be stored in secure memory on a TPM (trusted platform module), or visa versa. Similarly, the template, or any portion thereof, may be stored using any number secure memory devices or techniques, or any combination of secure devices or techniques.

Figure 2:
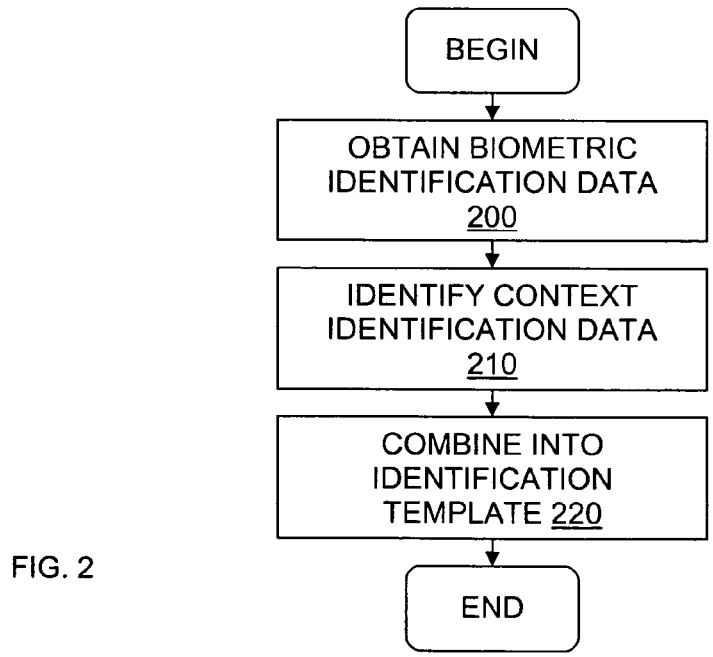
FIG. 2 illustrates one embodiment of creating an identification template.

FIGS. 2-10 demonstrate several embodiments or aspects of the present invention at various levels of detail. FIG. 2 demonstrates one embodiment of a high-level process for creating an identification template. The illustrated process obtains biometric data at 200, identifies context identification data at 210, and then, at 220, combines the biometric identification data and the context identification data into an identification template. As mentioned above, the biometric data and the context identification data can be obtained in any number of ways and in any number of formats, and the identification template can take any number of forms.

Figure 3:
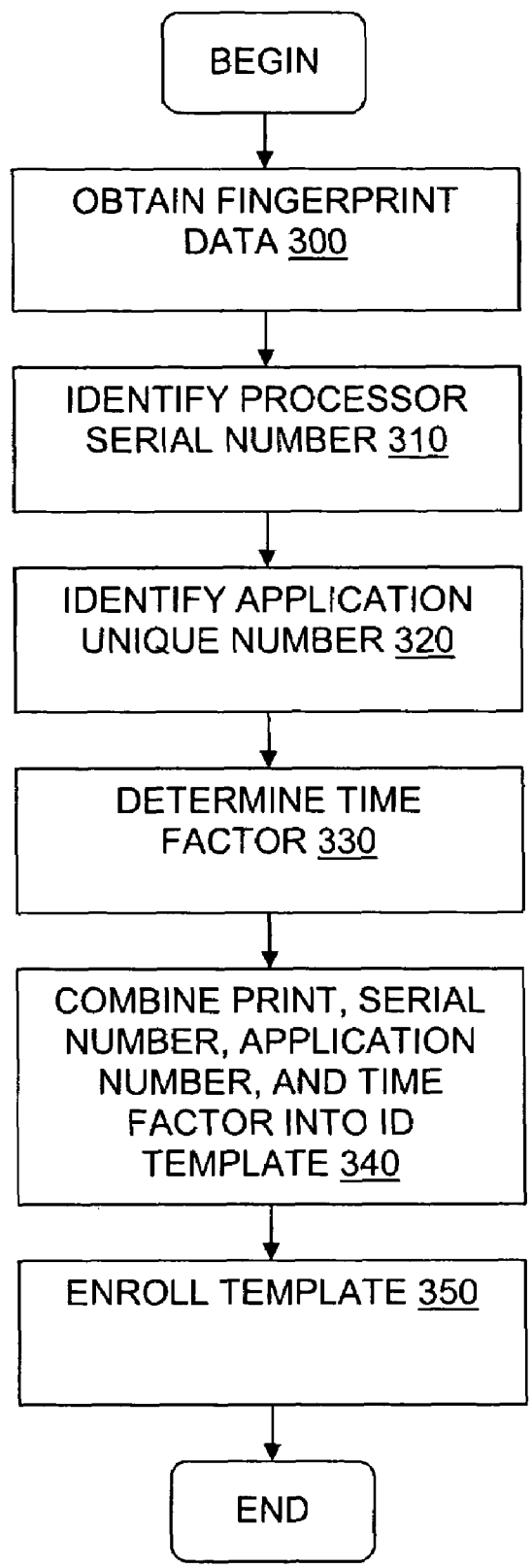
FIG. 3 illustrates one embodiment of enrollment.

FIG. 3 demonstrates one embodiment of the same type of process that could be used to create an identification template, but in more detail. At 300, the process obtains fingerprint data. The fingerprint data could be collected from a fingerprint scanner, or received from memory, as a bit map or in some more convenient mathematical representation. At 310, the process identifies a processor serial number. The processor serial number can be taken from a processor inside the platform to which access is being sought.

At 320, the process identifies a unique number for an application to which access is being sought. For example, several users may share one machine, but not all of the users may be authorized to access a particular application or resource on that machine. Or, several users may have access to a network, but not all of the users may be authorized to access a particular application or resource on the network. Or, a particular application or resource on a machine may simply warrant an additional level of security, such as an area of memory where particularly vital information is stored or an application that controls a particularly vital system or service. In each case, the application, service, or resource in question can be identified at 320 using a unique number. Other embodiments may identify an application, service, or resource in any number of ways, including randomly generated numbers, serial numbers, or virtually any other kind of identifying information. Other embodiments may identify multiple applications and/or services for inclusion in the identification template.

At 330, the process determines a time factor for the identification template, and, at 340 the process combines the fingerprint data, the processor serial number, and the time factor into an identification template. Once the identification template has been formed, the process enrolls the template at 350 so it can be used in the future. Enrollment can be done in several different ways, depending on how the template will be used for authentication.

Figure 4:
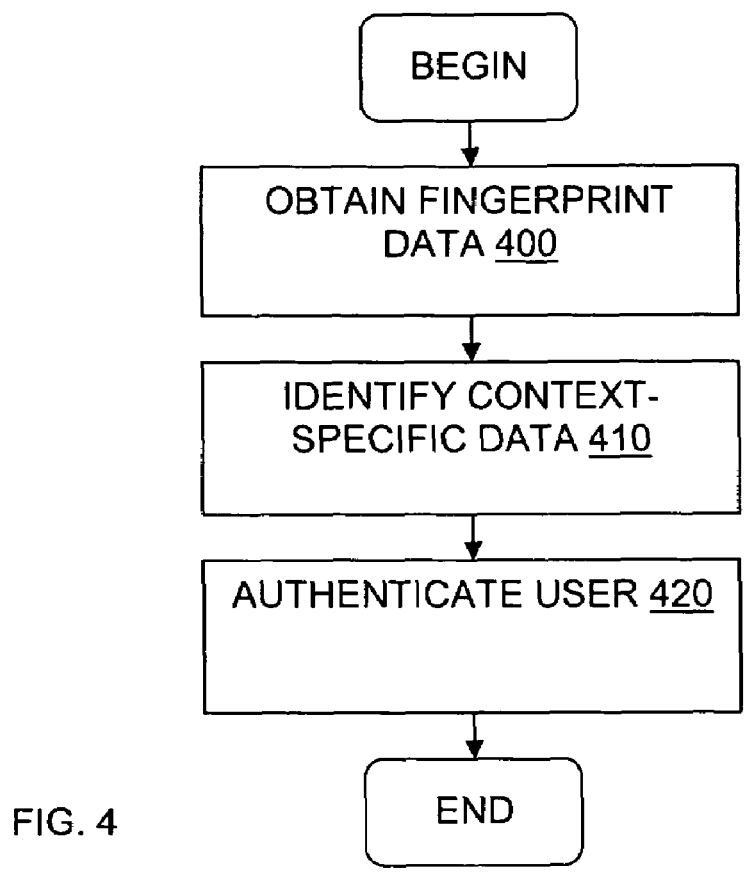
FIG. 4 illustrates one embodiment of authentication.

FIG. 4 demonstrates one embodiment of an authentication process at a high level. When an authentication attempt occurs, the process re-collects certain data used to create the identification template. That is, the process obtains current fingerprint data at 400. At 410, the process also identifies context-specific data, such as the platform identification, application identification, time factor, etc. Then, using the fingerprint data and the context-specific data, the process authenticates the user at 420. The details of authentication depend on the details of enrollment.

Figure 5:
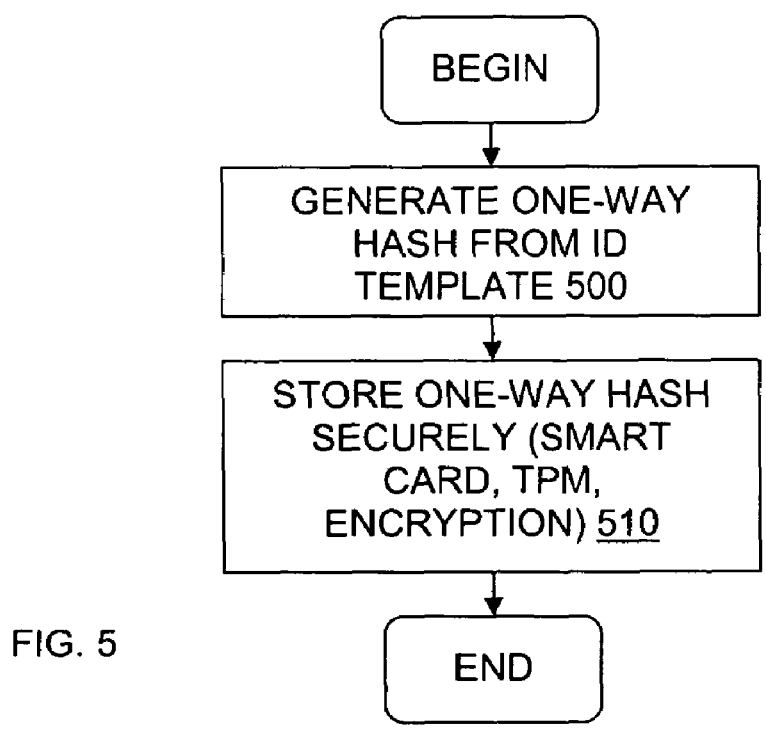
FIG. 5 illustrates one embodiment of enrolling a hash of an identification template.
Figure 6:
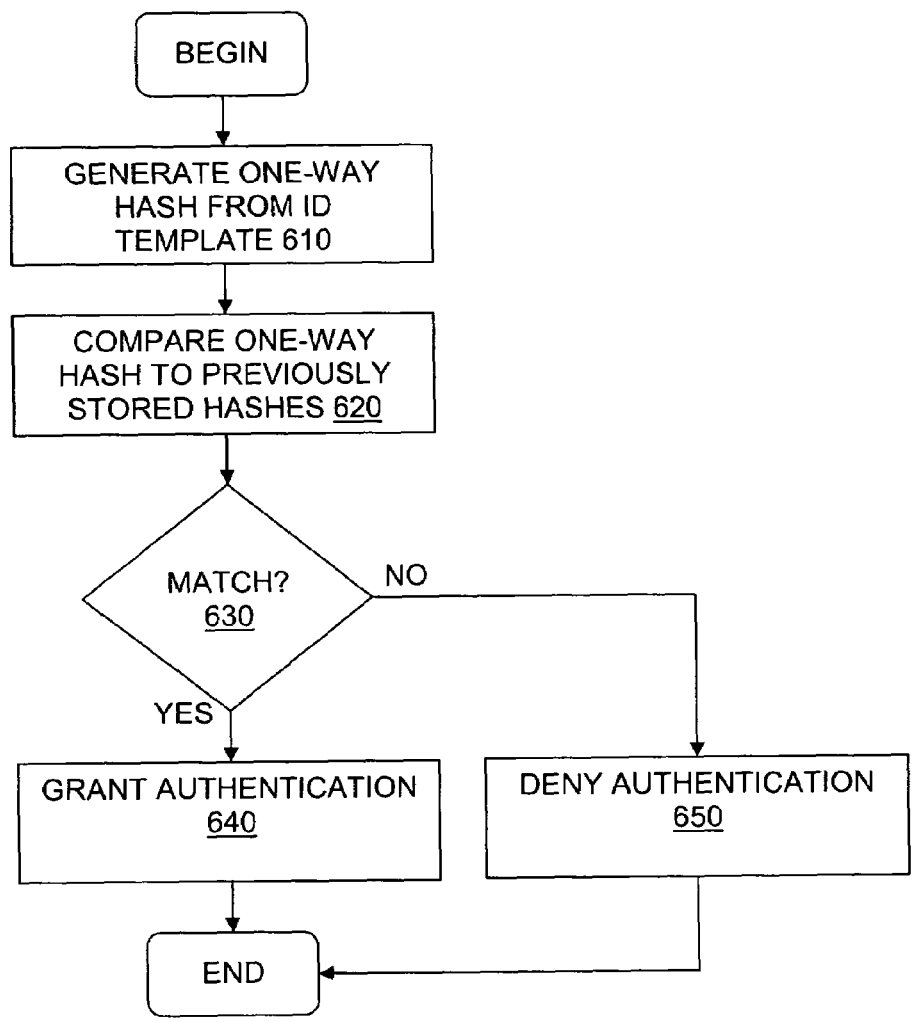
FIG. 6 illustrates one embodiment of authentication using an enrolled hash.

For example, FIG. 5 demonstrates one embodiment of an enrollment process that can be used if it is not necessary or convenient to store all of the data from the identification template. At 500, the process generates a one-way hash from an identification template. The hash may be based on fingerprint data, platform data, application data, etc. Then, at 510, the one-way hash is stored securely. For example, the hash could be stored to a smart card, a trusted platform module (TPM), or encrypted in memory.

Since the hash is essentially a compression of the other data fields in the identification template, the hash alone can be used to authenticate a user. For example, FIG. 6 demonstrates one embodiment of an authentication process based on hash comparison. After the current data has been collected, the newly collected data can be hashed at 610. At 620, the current hash can be compared to the previously stored hash. If the current hash and the previously stored hash match at 630, the process grants authentication for the user at 640. Alternatively, if any of the newly collected data is different from the previously hashed data, the hashes should not match at 630. In which case, the process will deny authentication at 650.

Figure 7:
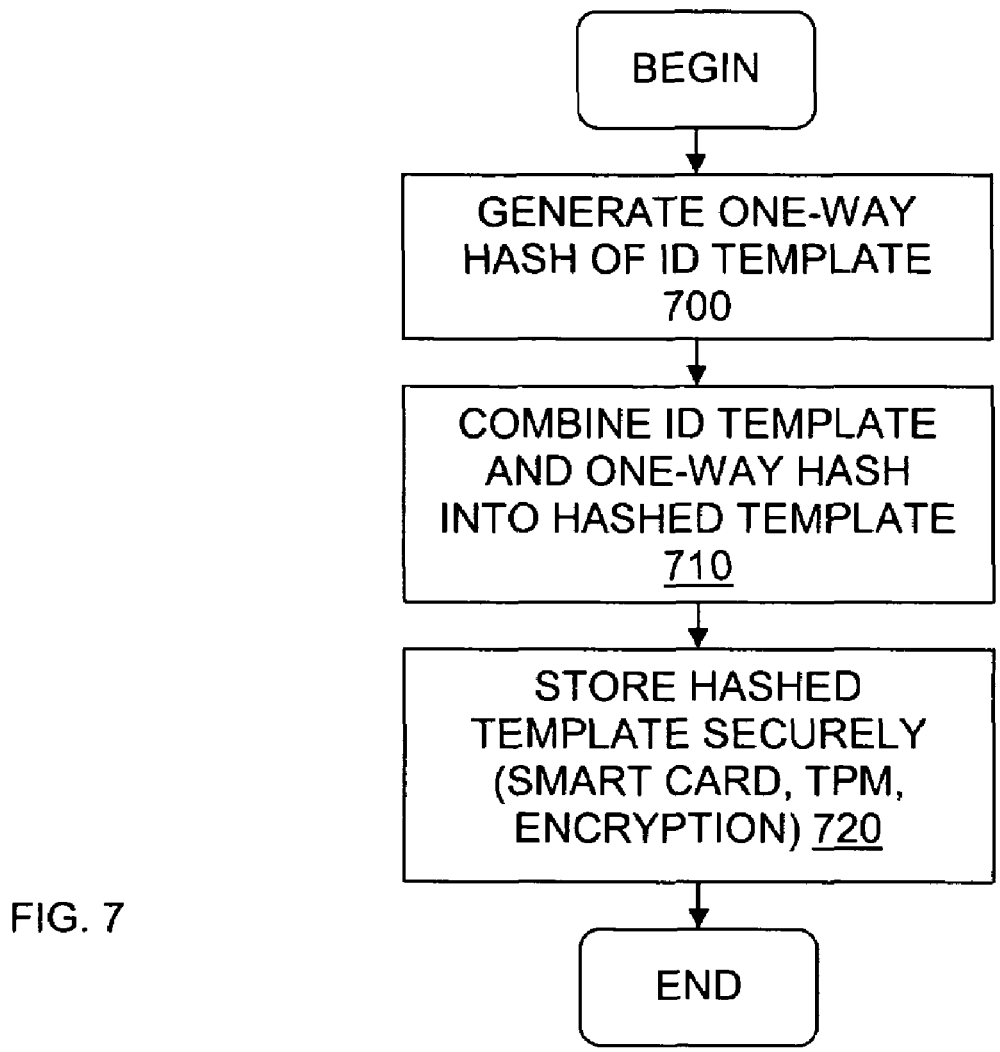
FIG. 7 illustrates one embodiment of enrolling an identification template.

On the other hand, FIG. 7 demonstrates one embodiment of an enrollment process that can be used if it is necessary or convenient to store one or more of the data fields from the identification template. For example, template 110 from FIG. 1 includes a time factor 150. In order to enforce the time factor, it may be convenient to store at least the time factor data in an un-hashed form.

In the illustrated embodiment, the enrollment process generates a one-way hash of the identification template at 700. At 710, the process combines the hash with the rest of the identification template. The combined template is called a hashed template in the illustrated embodiment merely to indicate that the template includes the hash data field. Then, at 720, the process securely stores the hashed template. In other words, all of the data fields are stored in un-hashed form along with the hash. Any number of devices and techniques can be used to securely store the data, including encryption, a smart card, and/or TPM. In other embodiments, the enrollment process may use only certain data fields to generate the hash, and the enrollment process may only store certain data fields in un-hashed form.

Figure 8A:
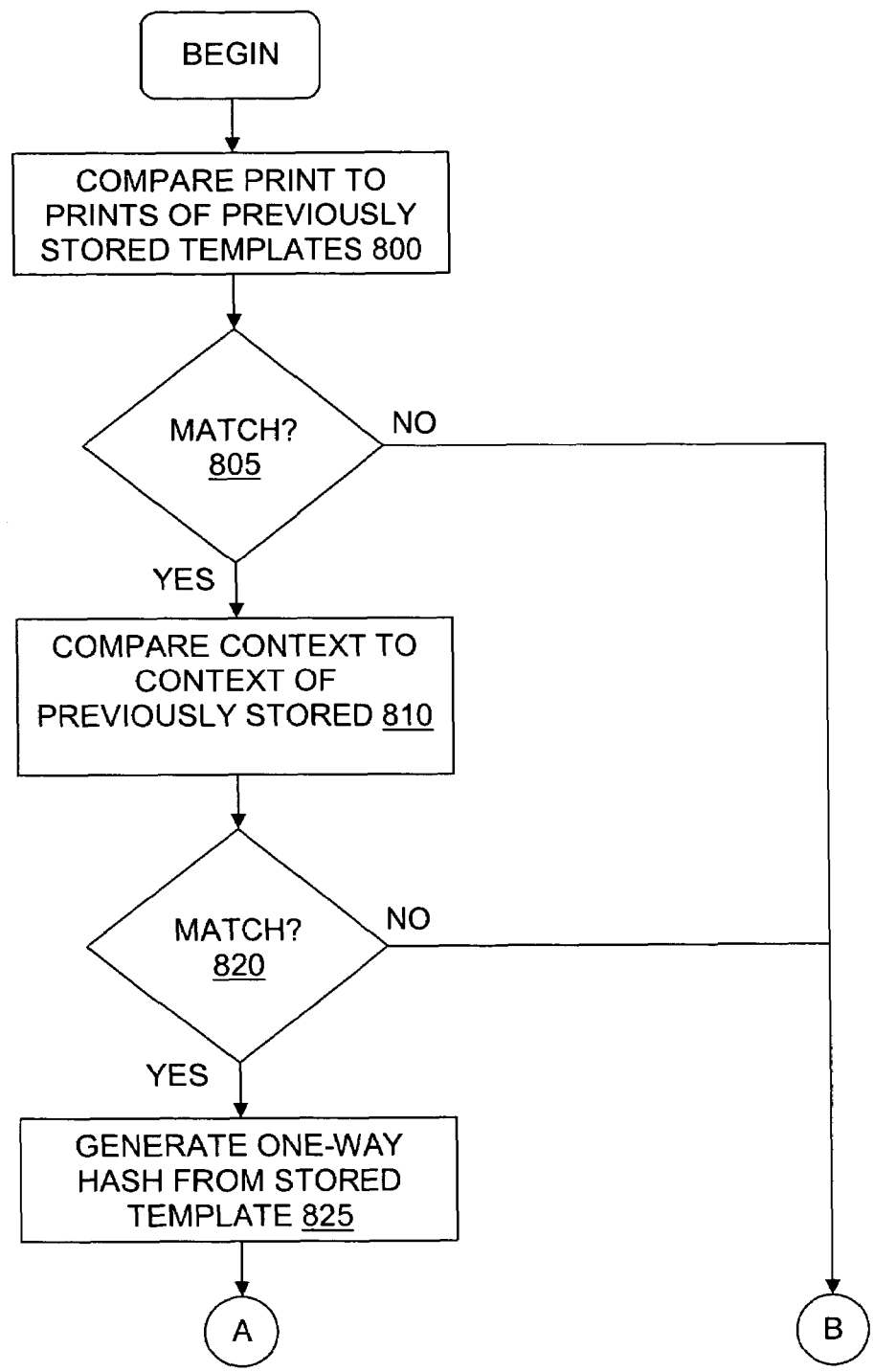
FIGS. 8A and 8B illustrate one embodiment of authentication using an identification template.
Figure 8B:
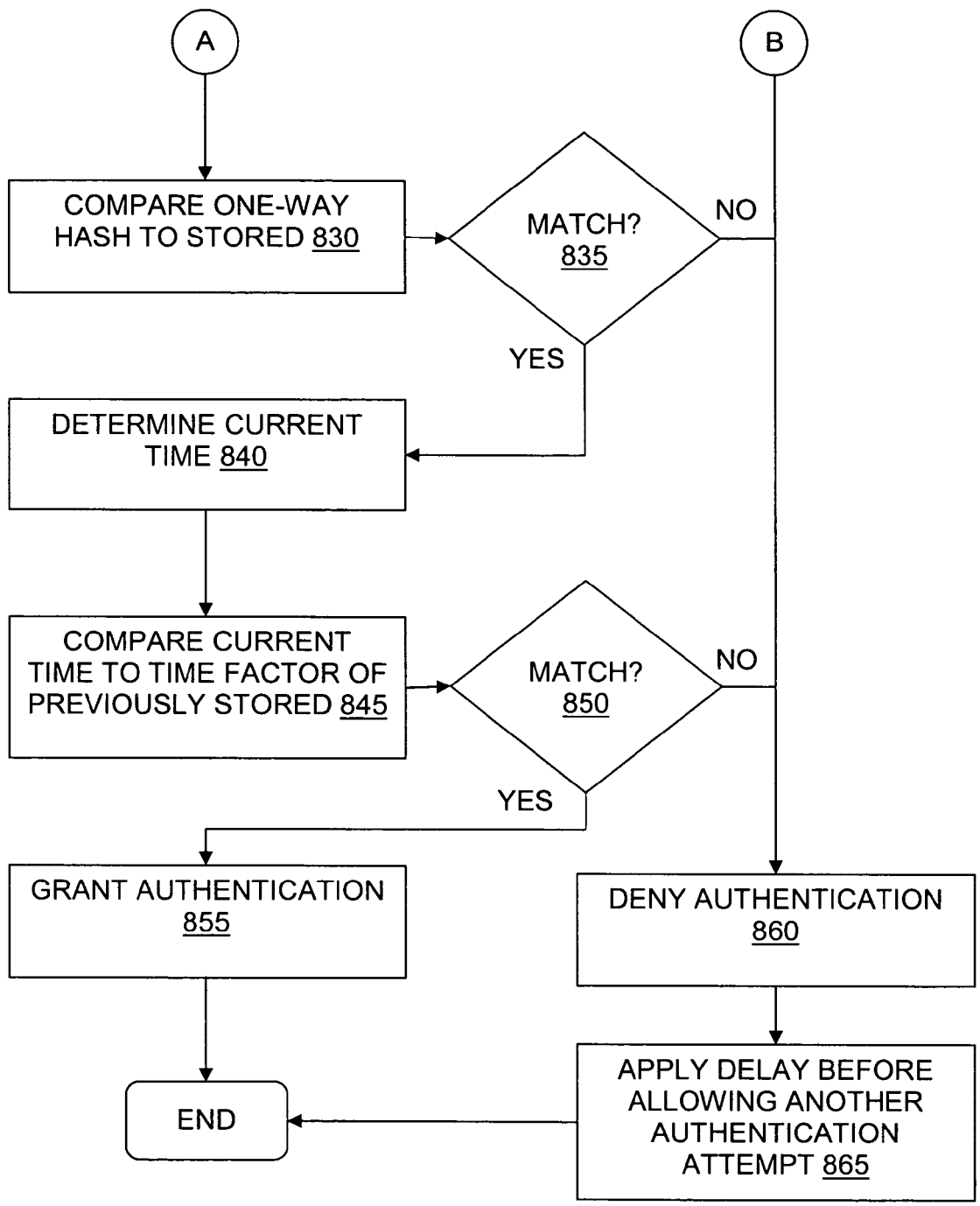

FIGS. 8A and 8B demonstrate one embodiment of an authentication process that could be used with an enrollment process in which the data fields are stored in clear form. At 800, the process compares the current fingerprint data to fingerprint data from one or more previously stored identification templates. This may involve a number of steps, depending on where and how the previously stored templates were stored. For instance, they may need to be read from a smart card and/or decrypted before they can be compared.

If the current fingerprint does not match a previously stored fingerprint at 805, then the current user either is not enrolled or the user's identification template has been corrupted. In either case, the process denies authentication at 860.

If, on the other hand, the current fingerprint does match a previously stored fingerprint at 805, the process compares the current context information with the context information stored in the template having the matching fingerprint at 810. If the context information does not match at 820, authentication is denied at 860.

This is the second line of defense. A bad actor may be able to misappropriate a valid user's fingerprint data and bypass a fingerprint scan to get to this point in the authentication process. But, if the bad actor does not also have the appropriate context information, access will be denied.

The context information can also be used to manage access rights. For example, the context information may list a platform and one or more applications or resources on that platform to which a particular user has access rights. In which case, at 810, the process may compare the current context information with a list of previously stored context information included in the identification template that was identified at 800. A matching identification template could be found at

820 if the current context information matches at least one of the contexts listed in the template.

Alternatively, each template may correspond to a single context. In which case, if a user has access rights to multiple applications or resources on a particular platform, the fingerprint comparison at 800 may identify multiple templates having matching fingerprint data. In which case, at 810, the process may compare the current context information with previously stored context information from multiple templates identified at 800.

In any case, if a previously stored template has been identified at 820, the process next determines if the previously stored template has been tampered with or corrupted. For example, if a bad actor were somehow able to access the previously stored template, he or she may replace the fingerprint data in the template with his or her own fingerprint data, and/or change the access rights defined by the context information, in an attempt to fool the authentication process. The authentication process, however, generates a one-way hash from the previously stored template at 825. The one-way hash is then compared to a one-way hash previously generated from the template at 830. If the hashes do not match at 835, the process denies authentication at 860. The process may also delete or disable the template in question, and/or generate some kind of indication that the template has been corrupted. Assuming the bad actor is not able to duplicate the hashing algorithm to replace the previously stored hash, the authentication process should be able to accurate detect the tampering.

If tampering is not detected at 835, the process determines the current time at 840 and compares the current time to the time factor of the previously stored template at 845. If the current time does not fall within the time factor at 850, the process denies authentication at 860. If the current time does fall within the time factor at 850, the process grants authentication at 855.

As mentioned above, the time factor can be defined in any number of ways. In which case, the current time can also be defined in any number of ways. For example, where the time factor defines a certain number of times that a user can access a device or resource, the current time may be the current number of times the user has attempted to access the resource. Similarly, where the time factor defines a expiration date, the current time may be the current date. Such time factors can be identified uniquely for each platform. For example, one implementation may choose to use a time factor based on Greenwich standard time. Another implementation may use the current time zone as retrieved from the operating system of the platform. Each implementation of the time factor can be randomized as the time factor is generated thus making it further difficult for a bad actor to alter the template having no knowledge of what time factor basis was used in the original generation.

In the illustrated embodiment, if the process has denied authentication at any point, the process applies a delay at 865 before allowing another authentication attempt to begin. The delay is intended to prevent a brute force attack. In a typical brute force attack, malicious software repeatedly tries different combinations of data until a combination is found that works. An identification template could be several hundred or even thousands of bits of data. Such brute force software attacks could be launched in very quick succession using today's high performance computers. Adding a time delay between attempts causes the brute force attack to be delayed so the overall possibility of randomly finding a matching combination is stretched to a larger degree. In which case, a brute force attack may require millions of attempts before hitting upon a matching combination that works. Adding a time delay would cause brute force attacks to take an unreasonably large amount of time with, for example, a five second delay imposed between each failed attempt.

Figure 9:
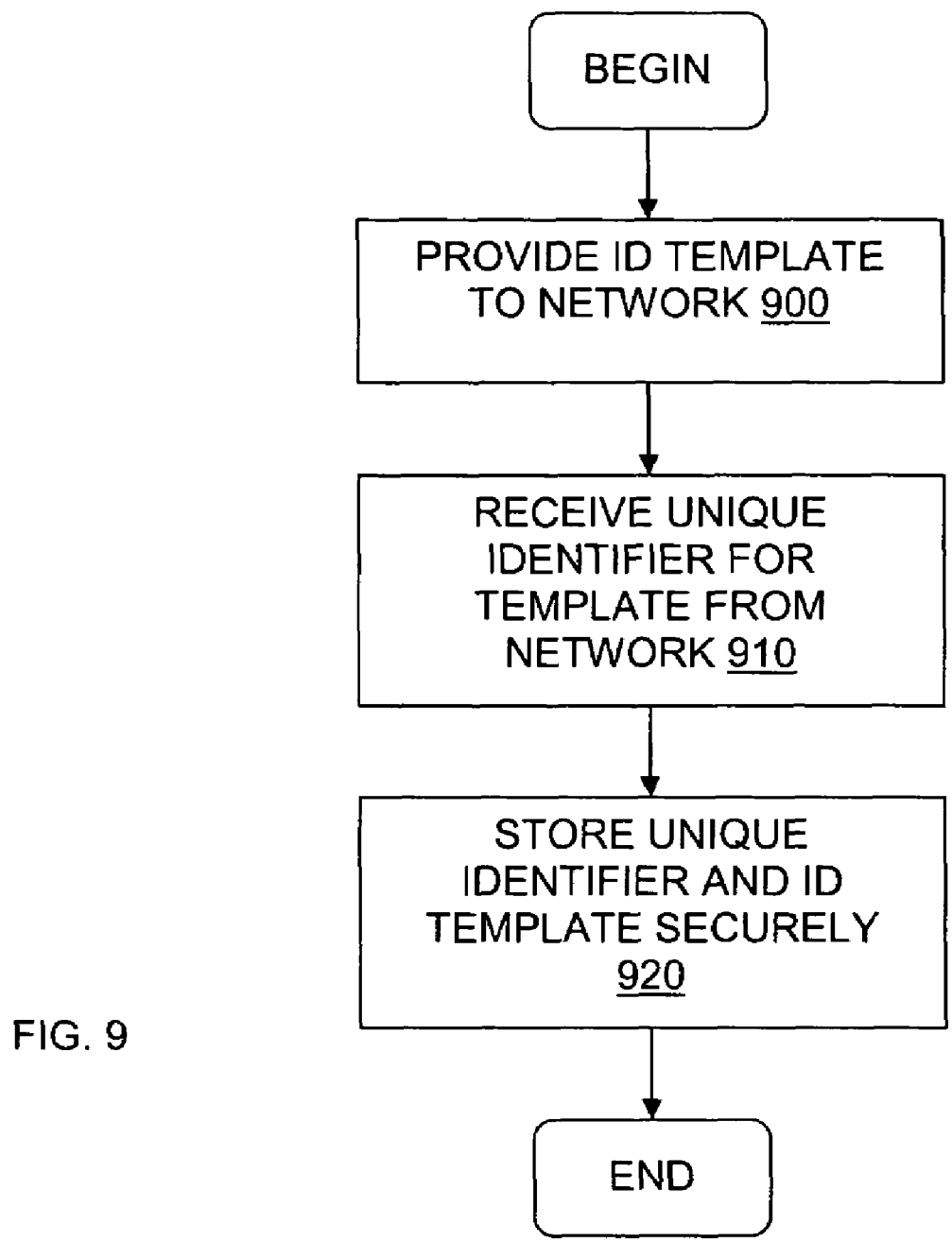
FIG. 9 illustrates one embodiment of network-based enrollment.
Figure 10:
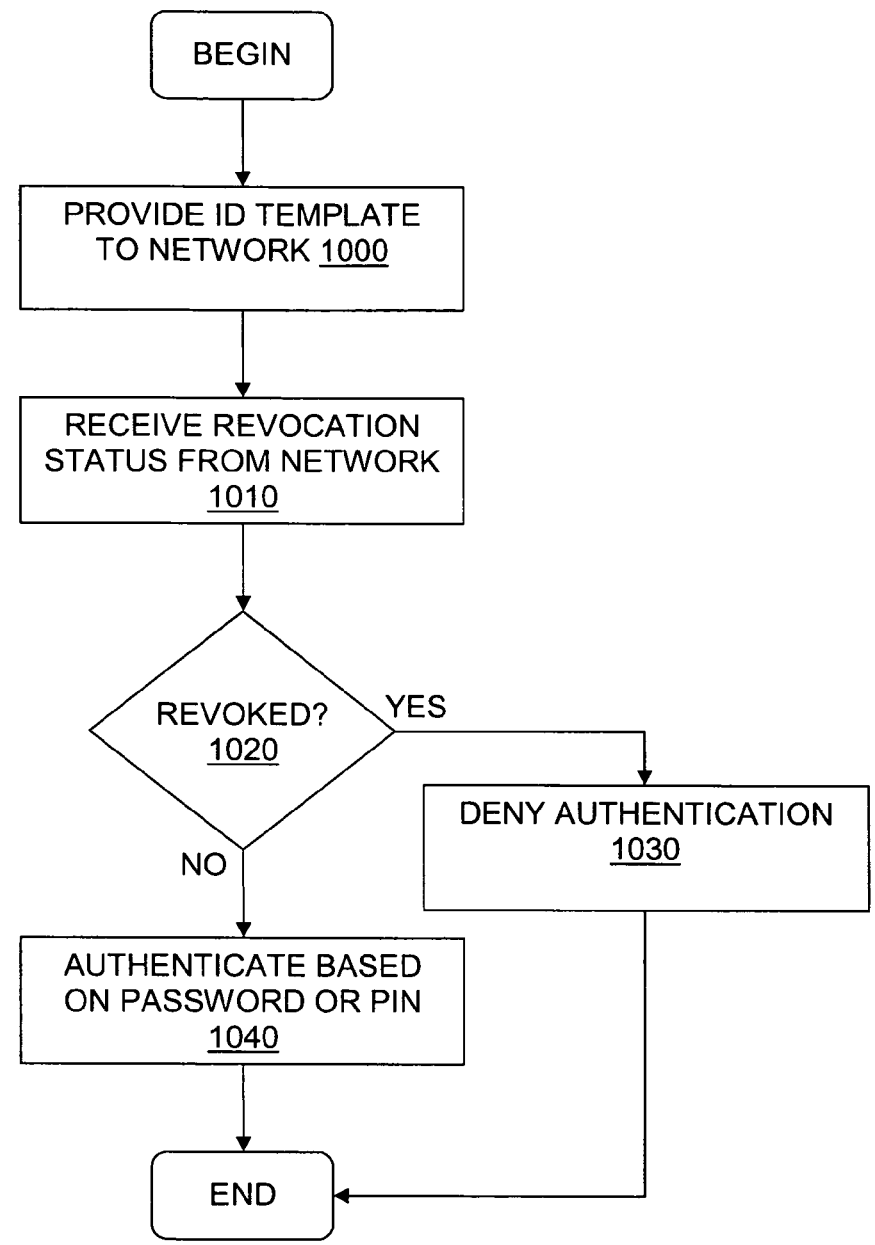
FIG. 10 illustrates one embodiment of network-based authentication.

FIG. 9 demonstrates one embodiment of a network-based enrollment process that could be used alone or in combination with another enrollment process, such as the processes described in FIGS. 5 and 7. In the illustrated embodiment, the process provides the identification template to a network at 900. At 910, the process receives a unique identifier for the template back from the network. At 920, the process securely stores the unique identifier and the identification template.

In alternate embodiments, the process may not send a copy of the entire identification template to the network. Instead, the process may send some other information that the network can use to recognize and distinguish the identification template from other templates. For instance, the process may locally generate the unique identifier and send the unique identifier to the network. In one embodiment, a locally-generated unique identifier could be a hash of the identification template. Also, alternate embodiments may not receive a unique identifier back from the network.

In any case, a network-based enrollment process can involve network interaction in the authentication process. For example, FIG. 10 demonstrates one embodiment of an authentication process that involves network interaction. The process of FIG. 10 could be inserted into, or follow, one of the previously discussed authentication processes. At 1000, the illustrated process provides an identification template to a network. In alternate embodiments, the process may send some form of indicator, such as a hash, of the template rather than the template itself.

At 1010, the process receives a revocation status from the network. The revocation status can indicate whether or not the network still recognizes the template as valid. If the template has been revoked at 1020, the process denies authentication at 1030 and ends. If the template has not been revoked at 1020, the process continues with the authentication process.

In the illustrated embodiment, the process takes the additional action of authenticating the user based on a password or PIN (personal identification number) at 1040. This additional action could be combined with any of the other authentication processes as well.

FIGS. 2-10 include a number of implementation-specific details. Other embodiments may include additional elements, may not include all of the illustrated elements, may arrange the elements in a different order, may combine one or more element, may separate one or more elements, etc.

Figure 11:
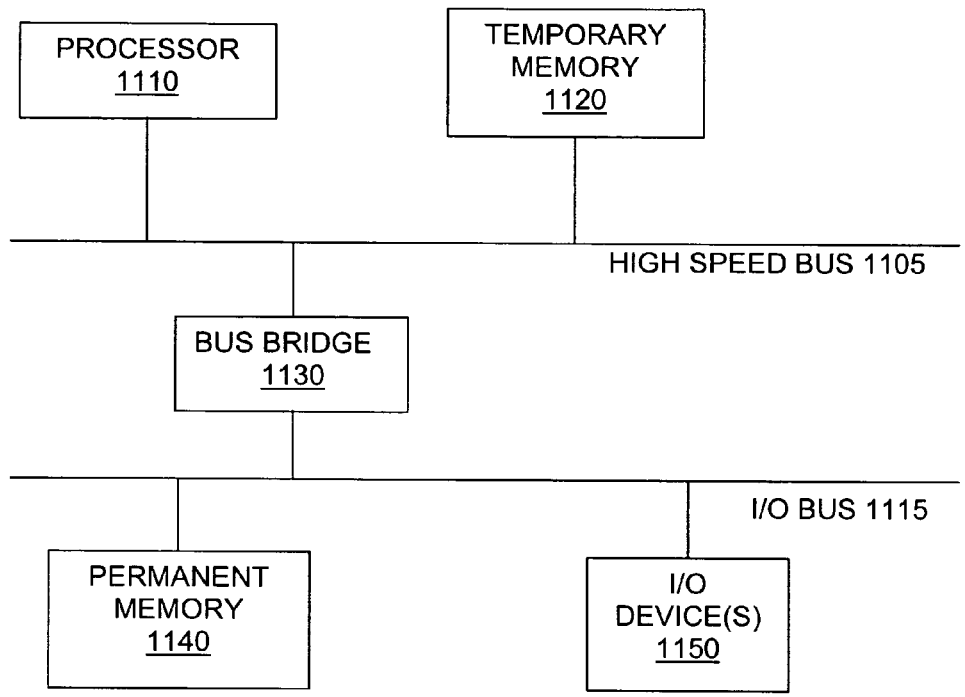
FIG. 11 illustrates one embodiment of a hardware system that can perform various functions of the present invention.

FIG. 11 illustrates one embodiment of a generic hardware system intended to represent a broad category of computer systems such as personal computers, workstations, personal data assistants (PDAs), and/or systems embedded in any of a variety of devices, such as home theater components. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, various functions of the present invention, as described above, can be implemented using one or more hardware systems such as the hardware system of FIG. 11. Where more than one system is used, the systems can be coupled to communicate over an external network, such as a local area network (LAN), an internet protocol (IP) network, etc.

In one embodiment, one or more functions of the present invention as described above may be implemented as software routines executed by one or more execution units within the computer(s). For a given computer, the software routines can be stored on a storage device, such as permanent memory 1140.

Figure 12:
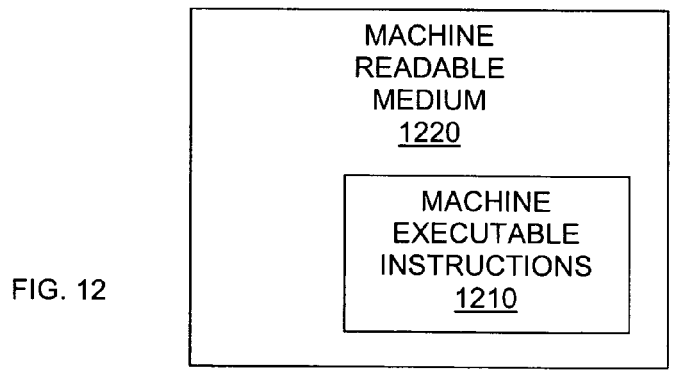
FIG. 12 illustrates one embodiment of a machine readable medium to store instructions that can implement various functions of the present invention.

Alternately, as shown in FIG. 12, the software routines can be machine executable instructions 1210 stored using any machine readable storage medium 1220, such as a hard drive, a diskette, CD-ROM, magnetic tape, digital video or versatile disk (DVD), laser disk, ROM, Flash memory, etc. The series of instructions need not be stored locally, and could be received from a remote storage device, such as a server on a network, a CD-ROM device, a floppy disk, etc., through, for instance, I/O device(s) 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the functions of the present invention described above may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, one or more programmable gate arrays (PGAs) could be used to implement one or more functions of the present invention. In yet another example, a combination of hardware and software could be used to implement one or more functions of the present invention.

Thus, biometric identification data protection is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   obtaining biometric identification data from a user of a particular device capable of accessing a resource;
   obtaining device identification data related to the particular device used by the user;
   combining the biometric identification data and the device identification data into an identification template; and
   storing the identification template for future authentication of the user for access to the resource only if the user is utilizing the particular device.

2. The method of claim 1 wherein the biometric identification data comprises at least one of fingerprint data, retina scan data, or facial recognition data.

3. The method of claim 1 wherein the particular device comprises at least one of a hardware platform or a software application.

4. The method of claim 1 wherein the device identification data comprises at least one of a processor serial number, an asset serial number of a system, a platform configuration register (PCR) value, or a unique software application identifier.

5. The method of claim 1 further comprising:
   determining a time factor for accessing the resource; and
   combining the time factor with the biometric identification data and the device identification data into the identification template.

6. The method of claim 5 wherein the time factor comprises at least one of a time limit, a time range, or a date for defining a validity of the identification template.

7. The method of claim 1 storing the identification template comprises:
   enrolling the identification template.

8. The method of claim 7 wherein enrolling the identification template comprises:
   generating a one-way hash of the identification template; and
   storing the one-way hash securely.

9. The method of claim 8 wherein storing the one-way hash securely comprises at least one of:
   storing the one-way hash to a smart card;
   storing the one-way hash to a trusted platform module (TPM); or
   encrypting the one-way hash.

10. The method of claim 7 wherein enrolling the identification template comprises:
    generating a one-way hash of the identification template;
    combining the one-way hash with the identification template into a hashed template; and
    storing the hashed template securely.

11. The method of claim 7 wherein enrolling the identification template comprises:
    registering the identification template with a network.

12. The method of claim 11 wherein registering the identification template with a network comprises:
    providing the identification template to the network.

13. The method of claim 12 wherein registering the identification template with the network further comprises:
    receiving a unique identifier for the template from the network; and
    storing the unique identifier and the identification template securely.

14. The method of claim 1 further comprising:
    authenticating a user based on the identification template.

15. The method of claim 14 wherein authenticating the user comprises:
    comparing the biometric identification data to biometric identification data in one or more previously stored identification templates; and
    if the biometric identification data matches the biometric identification data in a particular previously stored identification template, comparing the device identification data to device identification data in the particular previously stored identification template.

16. The method of claim 15 wherein authenticating the user further comprises:
   denying authentication to the user if either the biometric identification data or the device identification data do not match the particular previously stored identification template.

17. The method of claim 15 wherein authenticating the user further comprises:
   generating a one-way hash from the particular previously stored identification template;
   comparing the one-way hash to a previously stored one-way hash generated from the particular previously stored identification template; and
   denying authentication to the user if the one-way hash and the previously stored one-way hash do not match.

18. The method of claim 15 wherein authenticating the user further comprises:
   determining a current time;
   comparing the current time to a time factor of the particular previously stored identification template; and
   denying authentication to the user if the current time violates the time factor.

19. The method of claim 14 wherein, if an authentication attempt fails, the method further comprises:
   applying a delay before allowing another authentication attempt.

20. The method of claim 14 wherein authenticating the user comprises:
   generating a one-way hash from the identification template;
   comparing the one-way hash to one or more previously stored one-way hashes; and
   denying authentication to the user it the one-way hash does not match at least one of the previously stored one-way hashes.

21. The method of claim 14 wherein authenticating the user comprises:
   providing the identification template to a network, said network to determine if the identification template has been revoked; and
   denying authentication to the user if the identification template has been revoked.

22. The method of claim 14 further comprising:
   further authenticating the user based on at least one of a password or a personal identification number.

23. A method comprising:
   obtaining biometric identification data from a user of a particular device capable of accessing a resource;
   obtaining device identification data related to the particular device used by the user; and
   authenticating the user for access to the resource only if the user and the particular device are both verified based on the biometric identification data, the device identification data, and a previously stored identification template, which comprises a combination of previously obtained biometric identification data and previously obtained device identification data.

24. The method of claim 23 wherein authenticating the user comprises:
   comparing the biometric identification data to the previously obtained biometric identification data; and
   if the biometric identification data matches the previously obtained biometric identification data, comparing the device identification data to the previously obtained device identification data.

25. The method of claim 24 wherein authenticating the user further comprises:
   denying authentication to the user if either the biometric identification data or the device identification data do not match the previously stored identification template.

26. The method of claim 24 wherein authenticating the user further comprises:
   generating a one-way hash from the previously stored identification template;
   comparing the one-way hash to a previously stored one-way hash generated from the previously stored identification template; and
   denying authentication to the user if the one-way hash and the previously stored one-way hash do not match.

27. The method of claim 23 wherein authenticating the user comprises:
   determining a current time;
   comparing the current time to a time factor of the previously stored identification template; and
   denying authentication to the user if the current time violates the time factor.

28. The method of claim 23 wherein the previously stored identification template comprises a previously stored one-way hash generated from the previously obtained biometric identification data and the previously obtained device identification data, and wherein authenticating the user comprises:
   generating a one-way hash from a combination of the biometric identification data and the device identification data;
   comparing the one-way hash to the previously stored one-way hash; and
   denying authentication to the user if the one-way hash does not match the previously stored one-way hash.

29. A computer readable medium having stored thereon computer executable instructions that, when executed, implement a method comprising:
   obtaining biometric identification data from a user of a particular device capable of accessing a resource;
   obtaining device identification data related to the particular device used by the user;
   combining the biometric identification data and the device identification data into an identification template; and
   storing the identification template for future authentication of the user for access to the resource only if the user is utilizing the particular device.

30. The computer readable medium of claim 29, the method further comprising:
   determining a time factor for accessing the particular device; and
   combining the time factor with the biometric identification data and the device identification data into the identification template.

31. The computer readable medium of claim 29, the method further comprising:
   enrolling the identification template.

32. The computer readable medium of claim 31, wherein enrolling the identification template comprises:
   generating a one-way hash of the identification template; and
   storing the one-way hash securely.

33. The computer readable medium of claim 31 wherein enrolling the identification template comprises:
generating a one-way hash of the identification template;
combining the one-way hash with the identification template into a hashed template; and
storing the hashed template securely.

34. The computer readable medium of claim 31 wherein enrolling the identification template comprises:
registering the identification template with a network.

35. The computer readable medium of claim 29, the method further comprising:
authenticating a user based on the identification template.

36. The computer readable medium of claim 35 wherein authenticating the user comprises:
comparing the biometric identification data to biometric identification data in one or more previously stored identification templates; and
if the biometric identification data matches the biometric identification data in a particular previously stored identification template, comparing the device identification data to device identification data in the particular previously stored identification template.

37. The computer readable medium of claim 36 wherein authenticating the user further comprises:
generating a one-way hash from the particular previously stored identification template;
comparing the one-way hash to a previously stored one-way hash generated from the particular previously stored identification template; and
denying authentication to the user if the one-way hash and the previously stored one-way hash do not match.

38. The computer readable medium of claim 36 wherein authenticating the user further comprises:
determining a current time;
comparing the current time to a time factor of the particular previously stored identification template; and
denying authentication to the user if the current time violates the time factor.

39. The computer readable medium of claim 35 wherein authenticating the user comprises:
generating a one-way hash from the identification template;
comparing the one-way hash to one or more previously stored one-way hashes; and
denying authentication to the user if the one-way hash does not match at least one of the previously stored one-way hashes.

40. A computer readable medium having stored thereon computer executable instructions, the execution of which to implement a method comprising:
obtaining biometric identification data from a user of a particular device capable of accessing a resource;
obtaining device identification data related to the particular device used by the user; and
authenticating the user for access to the resource only if the user and the particular device are both verified based on the biometric identification data, the device identification data, and a previously stored identification template, which comprises a combination of previously obtained biometric identification data and previously obtained device identification data.

41. The computer readable medium of claim 40 wherein authenticating the user comprises:
comparing the biometric identification data to the previously obtained biometric identification data; and
if the biometric identification data matches the previously obtained biometric identification data, comparing the device identification data to the previously obtained device identification data.

42. The computer readable medium of claim 41 wherein authenticating the user further comprises:
generating a one-way hash from the previously stored identification template;
comparing the one-way hash to a previously stored one-way hash generated from the previously stored identification template; and
denying authentication to the user if the one-way hash and the previously stored one-way hash do not match.

43. The computer readable medium of claim 40 wherein authenticating the user further comprises:
determining a current time;
comparing the current time to a time factor of the previously stored identification template; and
denying authentication to the user if the current time violates the time factor.

44. The computer readable medium of claim 40 wherein the previously stored identification template comprises a previously stored one-way hash generated from the previously obtained biometric identification data and the previously obtained device identification data, and wherein authenticating the user comprises:
generating a one-way hash from a combination of the biometric identification data and the device identification data;
comparing the one-way hash to the previously stored one-way hash; and
denying authentication to the user if the one-way hash does not match the previously stored one-way hash.

45. A system comprising:
a mobile electronic device capable of accessing a resource; and
a security application to be implemented by the mobile electronic device, the security application to
obtain biometric identification data from a user of the mobile electronic device;
obtain device identification data related to the mobile electronic device;
combine the biometric identification data and the device identification data into an identification template; and
store the identification template for future authentication of the user for access to the resource only if the user is utilizing the mobile electronic device.

46. The system of claim 45, the security application further to:
generate a one-way hash of the identification template; and
store the one-way hash securely.

47. The system of claim 45, the security application further to:
generate a one-way hash of the identification template;
combine the one-way hash with the identification template into a hashed template; and
store the hashed template securely.

48. The system of claim 45, the security application further to:
compare the biometric identification data to biometric identification data in one or more previously stored identification templates; and
if the biometric identification data matches the biometric identification data in a particular previously stored identification template, compare the device identification data to device identification data in the particular previously stored identification template.

49. The system of claim 48, the security application further to:
- generate a one-way hash from the particular previously stored identification template;
- compare the one-way hash to a previously stored one-way hash generated from the particular previously stored identification template; and
- deny authentication to the user if the one-way hash and the previously stored one-way hash do not match.

50. The system of claim 45, the security application further to:
- generate a one-way hash from the identification template;
- compare the one-way hash to one or more previously stored one-way hashes; and
- deny authentication to the user if the one-way hash does not match at least one of the previously stored one-way hashes.

* * * * *